United States Patent [19]

Wenzel

[11] 4,388,737
[45] Jun. 21, 1983

[54] TOILET TANK INSERT WATER SAVER

[76] Inventor: John G. Wenzel, 422 Crotzer Ave., Folcroft, Pa. 19032

[21] Appl. No.: 312,085

[22] Filed: Oct. 16, 1981

[51] Int. Cl.³ .......................... E03D 1/00; E03D 1/24; E03D 1/20; E03D 5/00
[52] U.S. Cl. .......................................... 4/415; 4/324; 4/346; 4/364
[58] Field of Search ................... 4/415, 325, 324, 326, 4/346, 364, 661

[56] References Cited

U.S. PATENT DOCUMENTS

| | | | |
|---|---|---|---|
| 3,811,134 | 5/1974 | Throckmorton et al. | 4/415 |
| 3,812,544 | 5/1974 | Risley | 4/415 |
| 3,820,170 | 6/1974 | Kern et al. | 4/415 |
| 3,946,447 | 3/1976 | Moon | 4/415 X |
| 4,143,430 | 3/1979 | Joshi et al. | 4/415 X |
| 4,152,793 | 5/1979 | Mills | 4/415 X |
| 4,225,985 | 10/1980 | Joshi et al. | 4/415 X |
| 4,250,579 | 2/1981 | Moon | 4/415 |

Primary Examiner—Henry K. Artis
Attorney, Agent, or Firm—Anthony J. McNulty

[57] ABSTRACT

A fluid discharge regulating device to be used for conserving water in the toilet tanks of bathroom toilets. The device includes partitions that divide the toilet tank into three consecutively arranged compartments, each compartment providing fluid communication with other compartments, either directly or indirectly, through portholes in each partition. Each porthole opening is adjustable to control the rate of fluid flow into the second or middle compartment in order to maintain constant the amount of water used during a single flush. The volume of fluid reaching the toilet bowl can be increased beyond the preset level by holding down an adjustable handle which is connected to the flushing mechanism.

14 Claims, 4 Drawing Figures

TOILET TANK INSERT WATER SAVER

BACKGROUND OF THE INVENTION

Each time a tank-type toilet is flushed, three and one-half to eight gallons of water are used. Dams for reducing the amount of water used in one flush are known and have been used. Dams are flexible panels pressed into place in the tank. They block off a portion of the lower part of the tank thus reducing the amount of water released into the bowl. The dams allow the tank to refill completely, maximizing water velocity. Dams can save more water and do not interfere with the toilet's ability to flush away waste and are, therefore, better to use rather than switching to smaller tanks or displacing some water volume within the tank. In any case, there are patented variations on the way dams have been used to conserve water during a flushing cycle.

The U.S. Pat. No. 4,143,430 to Joshi et al. is a water conserving device which shows a flush tank with a single partition which traps and releases reserve water using a valve unit which opens and closes a single port in the partition. When continued rotation of a trip lever moves a flush arm, reserve water is permitted to flow through the port in the partition and exit the tank. However, as the reserve water level drops, the valve unit closes off the port. The water trapped by one partition is not used during each flush, but only when further flushing is required.

U.S. Pat. No. 4,152,793 to Mills discloses an inner reservoir within a conventional flush tank formed by a partition having a port. The port is prevented from allowing fluid to flow through it during a portion of the flush cycle by an air pump outside the flush tank which displaces a sphere to either open or close off said port. Again, the port opens and closes depending on whether more water is required to flush the waste.

U.S. Pat. No. 3,820,170 to Kern, et al. shows a partition system for flush tanks where the partitions would have to be fabricated to create a minimal, optimal water loss.

The U.S. Pat. No. 3,719,958 to Wilhelm shows a stand pipe having a series of small openings at the top through which water from the tank can replenish the water in the stand pipe to achieve a fractional flush.

SUMMARY OF THE INVENTION

A toilet fluid discharge regulating device for flush tanks which includes partitions that divide the flush tank into three, water-containing compartments. Water is permitted to flow into all three compartments, to a desired level, through portholes or plugholes in each partition, but, during flushing, water is allowed to flow out of the two end compartments into the middle or flushing compartment. The amount of water utilized during a flushing cycle can be minimized by controlling the amount of water flowing out of the two compartments that are in fluid communication with the flushing compartment. Flow control can be obtained by adjusting the size of each porthole using a gate that is pivotally mounted near and positionable over each port hole so as to increase or decrease the water flow rate into the flushing compartment during a flush cycle.

An object of this invention is to provide partitions that divide the flush tank into three sequential water retaining compartments that can be used to conserve water during a flush cycle.

Another object of this invention is to minimize the amount of water utilized during flushing by adjusting the size of portholes in the partitions for the purpose of controlling water flow from the two outside compartments to the middle or flushing compartment during flushing.

It is another object of this invention to provide a device which can be incorporated into a conventional flush tank without requiring modification thereof, or in anyway interfering with the operation of the flushing equipment located therein.

Yet another object is to provide for ease of installation of the partitions.

A further object of this invention is to control water flow rate through a plurality of plugholes by preventing water from flowing through a predetermined number of the plurality of plugholes in each partition.

It is a further object of this invention to control water flow rate between two compartments by using a combination of portholes and plugholes in each partition.

BRIEF DESCRIPTION OF THE DRAWINGS

Other objects and advantages of the invention will become apparent upon reading the following detailed description and upon reference to the drawings in which like numerals refer to like parts and in which.

While the invention will be discussed in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

Figure 1:
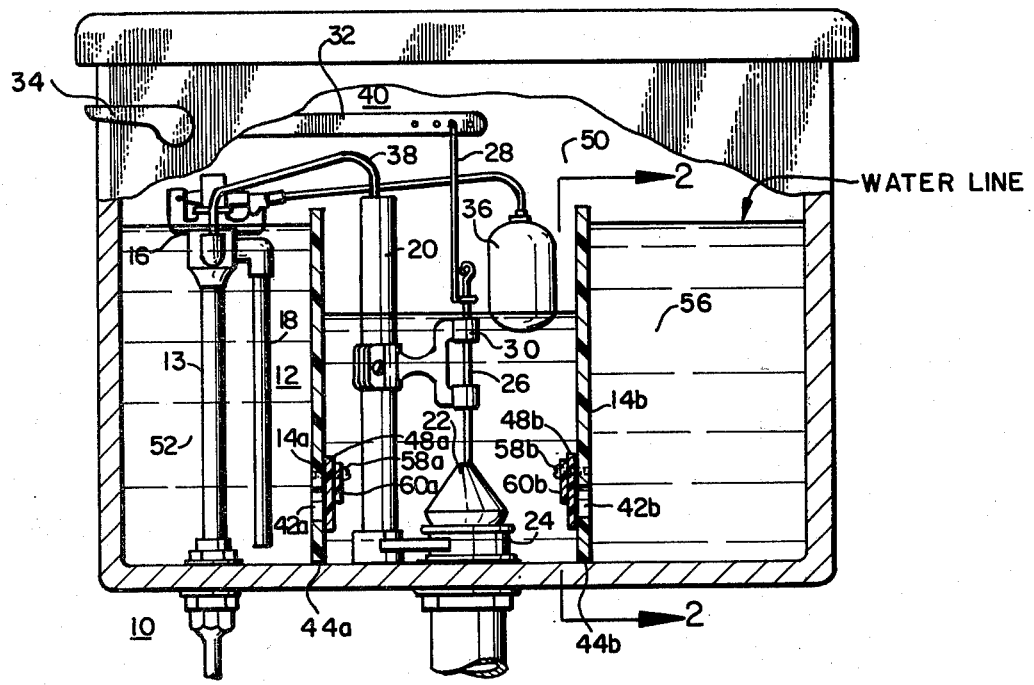
FIG. 1 is an enlarged frontal view showing the fluid discharge regulating device.

Referring to FIG. 1, conventional flush tank 10 contains fluid discharge regulating means 12 which includes a plurality of partitions 14a, 14b, inlet tube 13, inlet valve 16, filler tube 18, overflow pipe 20, ball valve or similar tank ball 22, combination ball seat and outlet 24, lower stem 26, upper stem 28, stem guide 30, trip lever 32, exterior trip lever handle 34, filling valve 36, and refill tube 38.

Flushing apparatus 40 includes said lever handle, said trip lever, stems 26 and 28, and said ball valve and combination ball seat and outlet.

Partitions 14a and 14b divide the interior 50 of a flush tank 10 into three compartments. The first compartment 52 is the filling tank compartment, the second compartment or middle compartment 54 is the flushing compartment, and the third compartment 56 is the reserve compartment. Each partition 14a and 14b has portholes 42a and 42b, respectively, as indicated in FIG. 1. Each of said portholes in each of said partitions are located within close proximity to the bases 44a, 44b, respectively, of each partition, and within close proximity to the back 46 of flush tank 10. Pivotally mounted within close proximity to portholes 42a and 42b are gates 48a and 48b, respectively. Attached to gates 48a and 48b are fasteners 60a and 60b, respectively, which movably secure said gates to said partitions with screws 58a and 58b, respectively. Since the structural characteristics of each partition are substantially the same, further consideration and description will be directed to porthole 42b in gate 48b in FIG. 2.

Gate 48b is pivotally mounted on partition 14b and is able to rotate about screw 58b. However, gate 48b can be rotated to and remain in any desirable position, i.e., from one that totally closes off the porthole 42b to one that totally opens porthole 42b.

Figure 2:
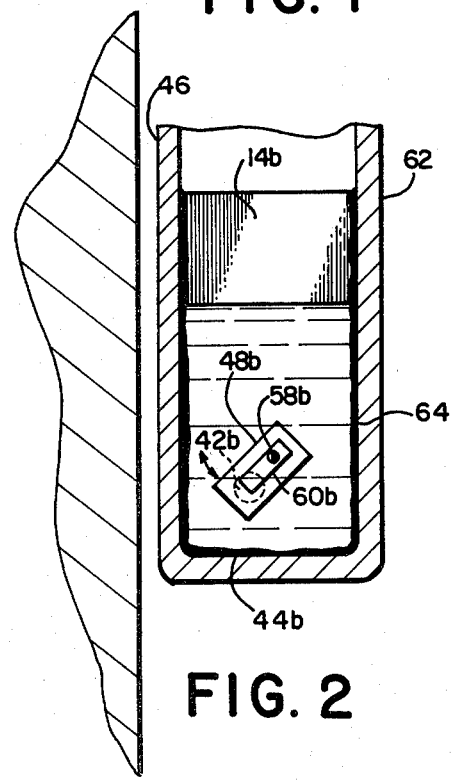
FIG. 2 is a cross-sectional view taken along 2—2 in FIG. 1 showing a partition, porthole, and gate.
Figure 3:
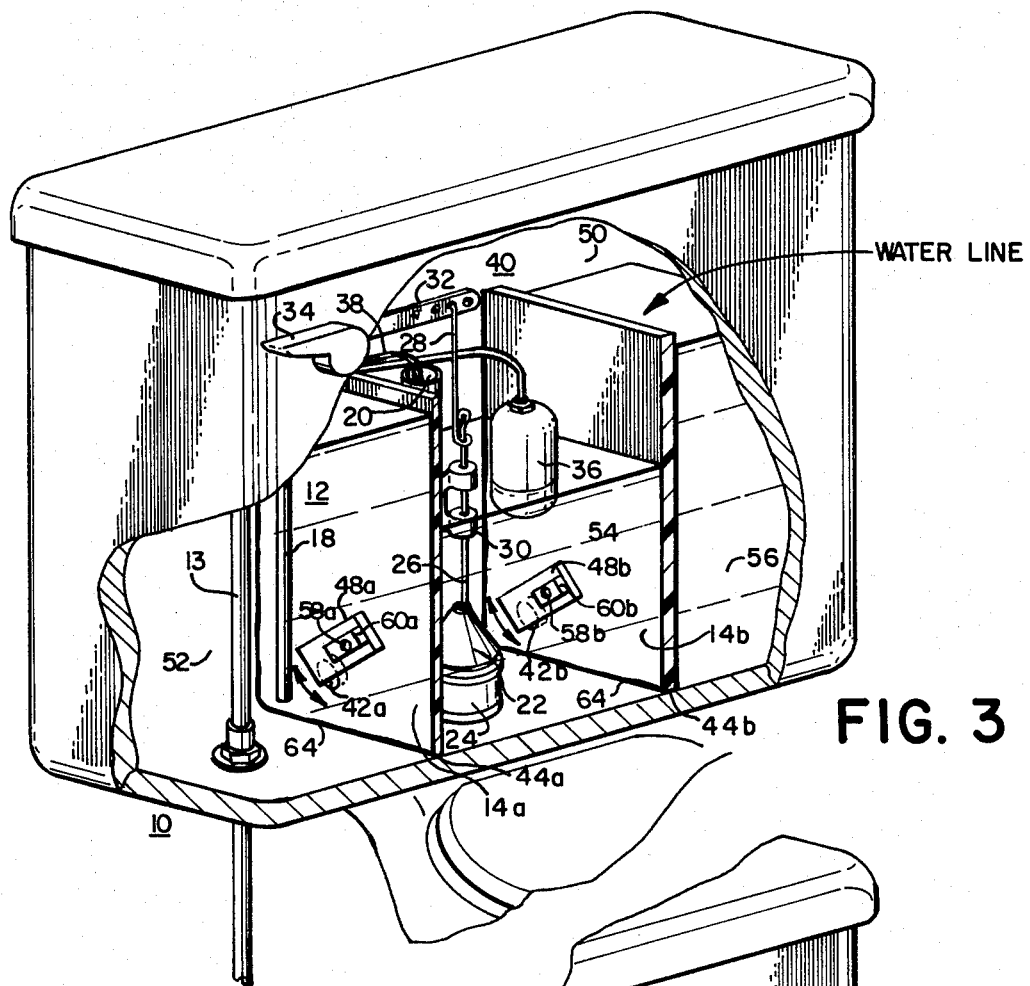
FIG. 3 is a perspective view of the flush tank showing the fluid discharge regulating device with pivotal gates.
Figure 4:
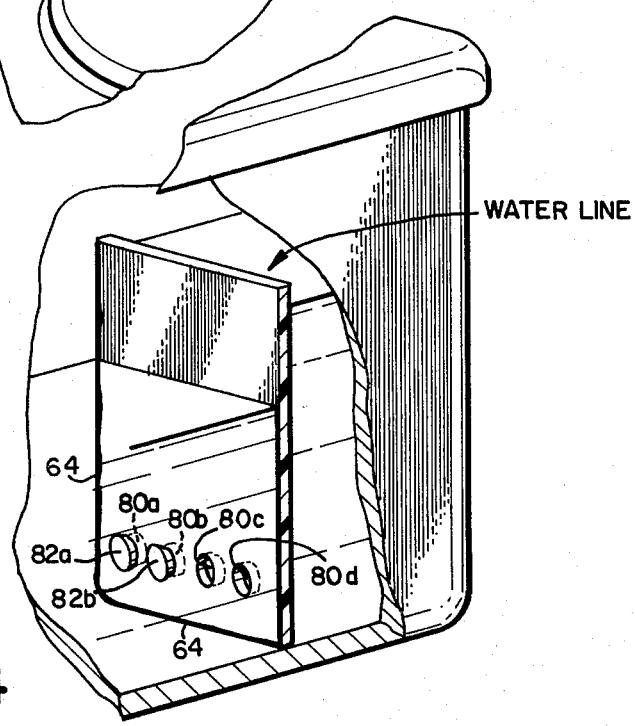
FIG. 4 is a perspective view of the flush tank showing one fluid discharge regulating device partition with plugholes.

Flushing compartment 54 completely surrounds a portion of the flushing apparatus 40, as shown in FIG. 1, where each partition 14a and 14b is perpendicularly sealed to the inner walls and bottom of flush tank 10, as shown for partition 14b in FIG. 2. The sealant could be a watertight gasket 64 or a similarly watertight adhesive caulking substance applied about the interface of each side of said partitions with each of the respective walls of said flush tank. Filling compartment 52 encases inlet tube 13, filler tube 18, and inlet valve 16. All three compartments, 52, 54, and 56 provide for the confining of a substantial amount of water. Water enters said filling tank through said filler tube and is allowed to pass through porthole 42a into said flushing compartment. From the flushing compartment 54, the water is allowed to flow through porthole 42b into the reserve compartment. In this embodiment of the invention, the water is allowed to reach a level which is approximately three-fourths the depth of said flush tank. When lever handle 34 is rotated to raise ball valve 22 from combination ball seat and outlet 24, water is released from said flushing compartment. The water line in compartment 54, as shown in FIGS. 1, 3, and 4, is at a level obtained after a short period of time elapses subsequent to the start of flushing. During the initial phase of the flushing sequence, water also flows into flushing compartment 54 from the first compartment 52 and from the third compartment 56 through portholes 42a and 42b, respectively. However, to conserve water, the total amount of water utilized in one flush cycle can be adjusted by rotating said gates about said screws. The gates may be positioned over each porthole so that the size of said portholes will allow for a combined flow rate, during the flushing cycle, from said first and third compartments into said second compartment, that will provide for a minimum amount of water needed for a complete flush of the excrement. Once the substantially optimal, minimal amount of water is provided for a complete flush after rotating said gates for the purpose of adjusting the size of said portholes, a greater water requirement may be obtained by holding the lever handle 34 down, increasing flush cycle time, and allowing more water to flow into the second compartment 54 from each of the other compartments. The water would still flow at the preset rate through adjustable portholes 42a and 42b, but over a longer flush cycle time period.

Fluid discharge regulating means 12 is used to conserve water by allowing only that amount necessary for a flushing cycle to be used. The amount of water that will be discharged through outlet 24 upon flushing of said tank is controlled by the adjustable portholes 42a and 42b. The size of each opening may be adjusted by rotatively positioning each gate about its respective porthole thereby reducing the rate of flow of water from the first and third compartments, 52 and 56, into the second compartment 54. Adjusting said portholes reduces the amount of water that would normally be used in the conventional tank that did not have partitions with adjustable portholes forming a fluid discharge regulating means.

Inasmuch as the front wall of different types of flush tanks are different configurations, it is also contemplated that the edges of each partition will conform to the interior walls of the flush tank, which they must necessarily closely follow. Furthermore, the partitions may be molded into flush tanks directly, or flush tanks may contain grooves or slits for receiving partitions that may, thereafter, be made watertight forming three water-containing compartments.

FIG. 4 shows another embodiment of a flow regulator and water conservation device for flush tanks. In this embodiment, partitions 14a and 14b have plugholes, 80a–d and 90a–d respectively, through which water may be allowed to flow from one compartment to another. Plugs may now be used to control the rate of fluid flow between compartments. Specifically, plugs 82a–b and 92a–b may be used to stop water flow through plugholes 80a–b and 90a–b, respectively, thereby adjusting the rate of fluid flow between the compartments so as to control the amount of water used during a single flush. The rate of flow may be further adjusted by simply removing or inserting plugs in the plugholes in the partitions. Water is conserved in such manner by increasing the number of plugholes that are plugged during a flushing sequence. Furthermore, a combination of portholes and plugholes with their respective gates and plugs may be used in each partition to control the rate of water flow from the first and third compartments into the second or flushing compartment.

Also, the partitions may be made of different heights, thicknesses, and widths to correspond to the size of the flush tank and the amount of water desired to be used during a flushing cycle.

The conventional float ball may be replaced by other conventional filling valves, Fluidmaster Toilet Tank Valve and Flusher ®, so as to avoid interference with the partitions.

Although the process for this invention has been described with reference to a particular embodiment thereof, it should be understood that those skilled in the art may make other modifications and embodiments thereof which will fall within the spirit and scope of the principles of this invention.

What is claimed is:

1. A tank for use in conjunction with a toilet having a bottom floor, a plurality of upstanding walls and flushing apparatus comprising:

partitions dividing said tank into first, second, and third water-retaining compartments for conserving water during flushing of said toilet, portholes predeterminedly positioned in said partitions within close proximity to the bottom floor of said tank to provide for water flow from said first and third compartments into said second compartment during flushing of said toilet, gates pivotally mounted to said partitions to cover and uncover said portholes, and attachment means fastened to said gates to set the degree of gate rotation required for controlling the rate of water flow into said second compartment through said portholes during flushing.

2. The tank of claim 1 in which said gates rotate about screws that movably secure said gates to said partitions.

3. The tank of claim 1 in which said partitions are fitted within said tank to conform to the contours of said tank and may be placed in the tank and securely pressed into engagement with said bottom floor and said walls of the tank without moving said flushing apparatus.

4. A toilet including a bowl and a tank in which said tank contains a bottom floor, a plurality of upstanding walls, flushing apparatus, and water-retaining barriers, said barriers comprising:

partitions that divide said tank into first, second, and third compartments, portholes positioned in each partition, gates pivotally mounted on each of said partitions and rotatively positionable over each of said portholes to provide for water flow from said first and third compartments into said second compartment through said portholes during flushing of said toilet, and attachment means fastened to said gates to set the degree of gate rotation required for controlling the rate of water flow into said second compartment through said portholes during flushing.

5. The toilet of claim 4 in which said gates rotate about screws that movably secure said gates to said partition.

6. The toilet of claim 4 in which said partitions are fitted to conform to the contours of said tank and may be placed in the tank and securely pressed into engagement with said bottom floor and said walls of the tank without moving said flushing apparatus.

7. The toilet of claim 4 in which an adjustable hold down means is coupled to said flushing apparatus for varying the volume of fluid delivered to said bowl during flushing.

8. A fluid discharge regulating means adapted to be used in conjunction with a toilet bowl and a flushing apparatus substantially surrounded by a toilet tank comprising:

partitions that divide said tank into first, second, and third water-retaining compartments for conserving water during flushing of said toilet, portholes predeterminedly positioned in said partitions within close proximity to the bottom floor of said tank to provide for water flow from said first and third compartments into said second compartment during flushing of said toilet, gates pivotally mounted to cover and uncover said portholes, and attachment means fastened to said gates to set the degree of gate rotation required for controlling the rate of water flow into said second compartment through said portholes during flushing.

9. The fluid discharge regulating means of claim 8 in which said gates rotate about screws that movably secure said gates to said partitions.

10. The fluid discharge regulating means of claim 8 in which said partitions are fitted to conform to the contours of said tank and may be placed in the tank and securely pressed into engagement with said bottom floor and said walls of the tank without moving said flushing apparatus.

11. The fluid discharge regulating means of claim 8 in which an adjustable hold down means is coupled to said flushing apparatus for varying the volume of fluid delivered to said bowl during flushing.

12. A fluid discharge regulating means adapted to be used in conjunction with a toilet bowl and a flushing apparatus substantially surrounded by a toilet tank comprising:

partitions that divide said tank into first, second, and third water-retaining compartments for conserving water during flushing of said toilet, said partitions extending above the normal water line of said tank and said second compartment containing said flushing apparatus.

a plurality of plugholes predeterminedly positioned in each of said partitions within close proximity to the bottom floor of said tank to provide for water flow from said first and third compartments into said second compartment during flushing of said toilet, and plugs insertable into said plugholes in each of said partitions for controlling the rate of water flow out of the two compartments through open plugholes into said second compartment during flushing, said plugs thereby adjustably controlling the amount of water reaching said toilet bowl during a flush sequence, the combination of said partitions, plugholes and plugs allowing for a combined flow rate from said three compartments during said flush sequence to provide a minimum amount of water needed for a complete flush.

13. The apparatus of claims 3, or 6, or 10 in which said partitions are fastened to said tank by close fitting resilient gasket means.

14. The apparatus of claims 3, or 6, or 10 in which said partitions are fastened to said tank by watertight adhesive caulking means.

* * * * *